United States Patent
Kapoor (10) Patent No.: US 10,162,763 B2
(45) Date of Patent: Dec. 25, 2018

(54) INVALIDATION OF TRANSLATION LOOK-ASIDE BUFFER ENTRIES BY A GUEST OPERATING SYSTEM

(71) Applicant: International Business Machines Corporation, Armonk, NY (US)

(72) Inventor: Shakti Kapoor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/954,681

(22) Filed: Nov. 30, 2015

(65) Prior Publication Data
US 2017/0153982 A1 Jun. 1, 2017

(51) Int. Cl.
| | |
|---|---|
| *G06F 12/1027* | (2016.01) |
| *G06F 9/455* | (2018.01) |
| *G06F 9/50* | (2006.01) |
| *G06F 12/1009* | (2016.01) |
| *G06F 12/14* | (2006.01) |

(52) U.S. Cl.
CPC ...... *G06F 12/1027* (2013.01); *G06F 9/45545* (2013.01); *G06F 9/5077* (2013.01); *G06F 12/1009* (2013.01); *G06F 12/145* (2013.01); *G06F 2212/1016* (2013.01); *G06F 2212/1052* (2013.01); *G06F 2212/152* (2013.01); *G06F 2212/657* (2013.01); *G06F 2212/683* (2013.01)

(58) Field of Classification Search
CPC ... G06F 2221/0711; G06F 2009/45587; G06F 21/566
See application file for complete search history.

(56) References Cited

U.S. PATENT DOCUMENTS

| | | | |
|---|---|---|---|
| 7,434,003 B2 | 10/2008 | Oney et al. | |
| 8,275,971 B2 | 9/2012 | Franke et al. | |
| 2006/0171350 A1* | 8/2006 | Taniguchi | H04L 12/1417 370/328 |
| 2006/0259732 A1* | 11/2006 | Traut | G06F 12/109 711/173 |

(Continued)

OTHER PUBLICATIONS

Microarchitectural denial of service: insuring microarchitectural fairness Written by: Grunwald, Dirk; Ghiasi, Soraya Microarchitecture, 2002. (MICRO-35). Proceedings. 35th Annual IEEE/ACM International Symposium on , Issue Date: 2002.*

*Primary Examiner* — Ann J Lo
*Assistant Examiner* — Leandro R Villanueva
(74) *Attorney, Agent, or Firm* — Patterson + Sheridan, LLP (57) ABSTRACT

Embodiments disclose techniques for enabling a guest operating system (OS) to directly invalidate entries in a translation lookaside buffer (TLB). In one embodiment, the guest OS receives one or more invalidation credits for invalidating translation entries in a translation lookaside buffer (TLB) from a hypervisor. The guest OS decrements one invalidation credit from the one or more invalidation credits after invalidating a translation entry in the TLB. Upon determining that there are no remaining invalidation credits, the guest OS requests additional invalidation credits from the hypervisor. The hypervisor may choose to allocate the additional invalidation credits, based upon a determination of whether or not the guest OS is a rogue OS that poses a threat or risk to other guest OS in a computing system.

20 Claims, 5 Drawing Sheets

(56) References Cited

U.S. PATENT DOCUMENTS

| | | | |
|---|---|---|---|
| 2009/0063771 A1* | 3/2009 | Toussi | G06F 12/0817 |
| | | | 711/118 |
| 2009/0063782 A1* | 3/2009 | Toussi | G06F 12/0817 |
| | | | 711/144 |
| 2010/0250895 A1* | 9/2010 | Adams | G06F 12/1009 |
| | | | 711/207 |
| 2013/0139262 A1* | 5/2013 | Glew | H04L 63/1466 |
| | | | 726/23 |
| 2013/0276070 A1* | 10/2013 | Lee | G06F 21/31 |
| | | | 726/4 |
| 2016/0070593 A1* | 3/2016 | Harris | G06F 9/4843 |
| | | | 718/106 |

* cited by examiner

INVALIDATION OF TRANSLATION LOOK-ASIDE BUFFER ENTRIES BY A GUEST OPERATING SYSTEM

BACKGROUND

The present disclosure generally relates to logical partitions in a computing system, and more specifically, to techniques that allow a guest operating systems (on a computing system) to invalidate translation look-aside buffer entries.

Administrators often logically partition the resources of computing systems through virtualization. These resources can include processors, memory, storage, etc. A hypervisor is used to expose virtualized computing hardware to different logical partitions (or virtual machines). Each logical partition can run a different operating system (OS). The hypervisor can provide each OS with a set of virtualized computing hardware.

Further, processors include at least one memory management unit (MMU) for performing virtual to physical address translations. For example, the processor may assign blocks of virtual memory to different processes executing on the processor (e.g., operating systems or user applications). Each of the virtual addresses corresponds to a physical memory address in memory. The mappings between the virtual and physical addresses are stored in a page table as page table entries. When a process sends a request to a processing core to read data from, or write data to, a particular virtual address, the MMU queries the page table (or a translation lookaside buffer (TLB)) to identify the corresponding physical address. The processing core then uses the physical address to perform the read or write requested by the process.

The TLB is generally a cache of the page table, representing a subset of the page table contents. In general, it is quicker for a processor to access the TLB for a translation than for the processor to access the page table (which is typically stored in main memory). In some cases, however, the entries in the TLB may become invalid, e.g., due to a process switch in which the processor goes from executing one process (which uses one virtual to physical mapping) to another process (which uses a different virtual to physical mapping).

Generally, before any TLB entry is invalidated, the operating system has to call the hypervisor which is tasked with invaliding TLB entries. Doing so in this manner prevents operating systems, which may pose security threats, from affecting other operating systems in the computing system. At the same time, however, using the hypervisor to invalidate TLB entries can be inefficient for large numbers of operating systems (e.g., as a large number of instructions may have to be executed before a TLB entry is invalidated).

SUMMARY

One embodiment presented herein describes a method. The method generally includes receiving, by a guest operating system, one or more invalidation credits for invalidating translation entries in a translation lookaside buffer (TLB) from a hypervisor. The method also includes decrementing one invalidation credit from the one or more invalidation credits after invalidating a translation entry in the TLB. The method further includes, upon determining that there are no remaining invalidation credits, requesting additional invalidation credits from the hypervisor.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments presented herein disclose techniques for enabling a guest OS to invalidate TLB entries, e.g., without going through the hypervisor. Embodiments presented herein also disclose techniques for detecting and preventing guest OSs, which pose a security threat and/or risk to other guest OSs, from affecting the other OSs in a computing system. As such, the techniques presented herein provide improved performance compared to traditional architectures, in which the guest OS is not allowed to invalidate TLB entries.

In traditional computing systems, guest OSs are generally not allowed to do their own invalidation of TLB entries because the guest OS is generally not a trusted OS. For example, in many cases, the guest OS can represent a security threat and/or risk to other guest OSs in the computing system. Using a denial-of-service (DOS) attack as a reference example, if a guest OS were allowed to invalidate TLB entries (without permission from the hypervisor), the guest OS could prevent other guest OSs from operating and/or substantially reduce the performance of the other OSs (e.g., denial of service) by preventing, through the use of translation lookaside buffer invalidate entry instructions (tlbies), the guest OSs from accessing virtual to physical translations that are within the TLB. As such, traditional computing systems generally allow only the hypervisor to invalidate TLB entries.

However, using the hypervisor to invalidate TLB entries is an inefficient process. For example, an architecture that dictates that guest OS call the hypervisor to invalidate a TLB entry typically has to execute several instructions before the TLB entry is invalidated, which reduces the performance of the guest OS.

As described in more detail below, the techniques presented herein allow for a guest OS to directly invalidate TLB entries, while detecting and preventing guest OSs from posing a hazard to other OSs in a computing system. In one embodiment, the hypervisor can allocate a number of TLB invalidation credits (e.g., tlbie credits) to each guest OS operating on a computing system. Each guest OS can use the tlbie credits to directly invalidate TLB entries. The hypervisor can monitor the operation of the guest OS, including the use of the tlbie credits by each guest OS. Based on the use of the credits, the hypervisor can determine whether the guest OS is a "rogue" OS (e.g., an OS that presents a security risk or threat to the other OSs operating in the computing system, etc.). For example, if the hypervisor determines that a guest OS is exceeding its use of tlbie credits, the hypervisor may determine that the guest OS is participating in a denial of service (DOS) attack or some other security attack. If the hypervisor determines the guest OS is a "rogue" OS, the hypervisor can take steps to isolate such rogue OS, e.g., by quarantining the rogue OS, denying the rogue OS any further allocation of tlbie credits, denying operating time for the rogue OS by the processor, etc. The hypervisor may also report the rogue OS to an administrator to let the administrator take steps to intervene.

As such, the techniques presented herein allow a guest OS to do its own invalidation of TLB entries (e.g., without calling the hypervisor) which substantially improves performance of the OS. In addition, the techniques presented herein also allow for detecting guest OS that pose a security risk and/or threat and quarantining such rogue OS from other parts of the computing system.

Note that the following embodiments use context switching, in which the hardware (e.g., processor, etc.) of a computing system switches one from running one process (and hence one address space) to another process (and hence a different address space) as one reference example of a situation in which the entries of the TLB may be invalidated, e.g., by a guest OS. Note, however, that the techniques presented herein, which allow guest OS to invalidate TLB entries, can also be applied in other situations. Further, note that the following embodiments also refer to denial of service (DOS) attacks as a reference example of a type of attack that may be performed by a rogue OS that is issuing an excessive amount of tlbies. Those of ordinary skill in the art, however, will understand that other types of attacks and/or vulnerabilities may also be detected using the techniques presented herein.

Figure 1:
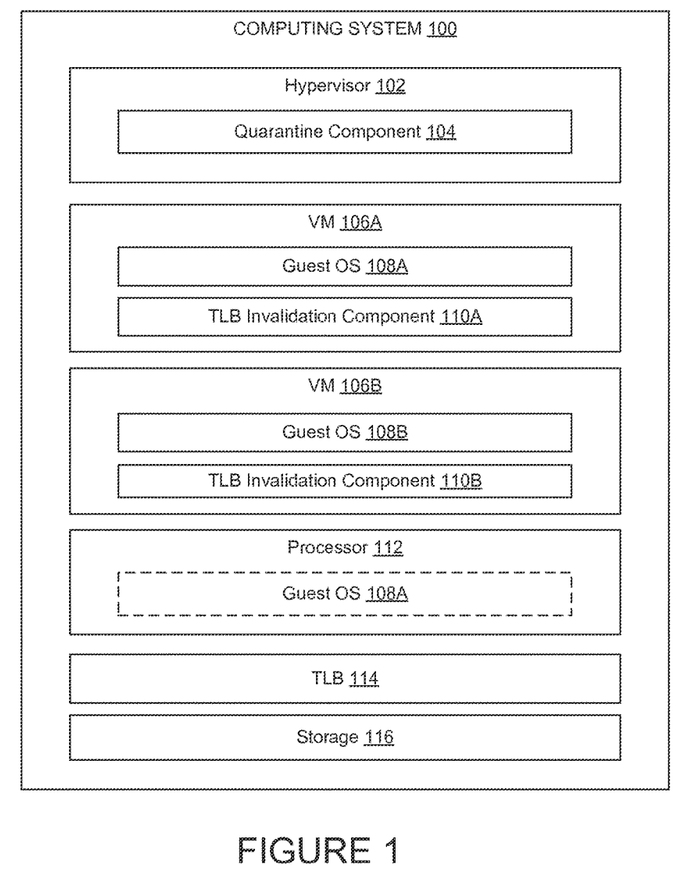
FIG. 1 illustrates an example computing system that allows guest OSs to invalidate TLB entries, according to one embodiment.

FIG. 1 illustrates an example computing system 100, in which the techniques presented herein may be practiced, according to one embodiment. As shown, the computing system 100 includes a hypervisor 102, VM 106A, VM 106B, processor 112, TLB 114, and storage 116. The hypervisor 102 (i.e., a virtual machine monitor (VMM)) is software and/or hardware that manages and executes the VMs 106 (also referred to as logical partitions or LPARs) in the computing system 100. Generally, the hypervisor 102 is an intermediary between the VMs 106 and the hardware in the computing system 100 (e.g., the processor 112, storage 116, etc.). As shown, guest OS 108A is the operating system for VM 106A, while guest OS 108B is the operating system for VM 106B. Each guest OS 108 is capable of executing one or more applications (or processes) not shown. Examples of guest operating systems include versions of the UNIX operating system (such as the AIX operating system), versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

In one embodiment, the hypervisor 102 controls which VM 106 (and its corresponding guest OS 108) is currently being executed by the processor 112. Put differently, the hypervisor 102 can schedule the processing time of the processor 112 such that different blocks of processing time (or time slices) are assigned to different VMs 106 in the computing system 100. In this example, VM 106A is currently scheduled to use the processor 112. As such, the processor 112 executes instructions provided by the processes operating in guest OS 108A as indicated by the dotted box in processor 112. Note that although FIG. 1 illustrates just two VMs 106, the computing system 100 may include any number of VMs that split processing time on the processor 112.

The processor 112 represents any number of processing elements that each may include one or more processing cores. If the processor 112 includes multiple cores, in one embodiment, the VMs 106 may be scheduled to use the individual cores at different blocks of time. For example, the guest OS 108A of VM 106A may be scheduled to use a first core in processor 112, while guest OS 108B of VM 106B is scheduled to use a second core in processor 112. Alternatively, the VMs 106 may use the entire processor 112 (which includes multiple cores) during their scheduled time period. For example, all the cores in processor 112 may be performing instructions issued by the guest OS 108A. While VM 106A is scheduled to use processor 112, the guest OS 108B of VM 106B may be idle. Put differently, the hypervisor 102 stalls the processes running on guest OS 108B until its scheduled time to use the processor 112.

The computing system 100 also includes a TLB 114 for performing the virtual to physical address translations requested by the processor 112. In one embodiment, the TLB 114 can be considered as a type of a cache that stores only a portion of the entries in a page table (not shown) for a guest OS (such as guest OS 108A, 108B, etc.). For example, the TLB 114 may maintain recent translations of virtual address to physical addresses used by a particular process or application (of a guest OS). For example, the TLB 114 may be an associative memory (e.g., content addressable memory (CAM)) that is above other types of memory (e.g., such as cache, main memory, etc.) in the memory hierarchy. Put differently, the TLB 114 is closer to the processor 112 than other types of memory or storage.

When the processor 112 executes a process associated with guest OS 108A, the processor 112 may first query translation entries in TLB 114. If the processor 112 is unable to find the appropriate memory translation, the processor 112 may search the page table (not shown), which is typically located in main memory, for the appropriate memory translation. If the main memory does not have the desired mapping, the processor 112 may retrieve the virtual address from storage 116, which may contain copies of all the page tables in the computing system 100. Storage 116 may represent random access memory (RAM) devices that include the main storage of the computing system 100, as well as supplemental levels of memory, e.g., cache memories, non-volatile or backup memories (e.g., programmable or flash memories), read-only memories, and the like. In addition, storage 116 may include memory storage physically located in the computing system 100 or on another computing device coupled to the computing system 100.

In one embodiment, because the guest OS 108A and 108B may execute different processes which use different virtual address spaces, one or more entries in the TLB 114 may become invalid (or no longer useful) for the subsequently run process. In such situations, the computing system 100 would generally mark such entries as invalid, e.g., to ensure that the next process (which is about to run) does not accidentally use a virtual to physical translation from a previous process. As mentioned above, however, due, in part, to security concerns, traditional architectures typically do not allow guest OS to invalidate TLB entries. Rather, these traditional architectures generally require the guest OS to call the hypervisor, which is responsible for invaliding TLB entries.

Embodiments presented herein however present techniques which can allow guest OS to invalidate TLB entries, while allaying security concerns associated with providing guest OSs with such ability. As shown in FIG. 1, for example, each VM 106A and 106B includes a TLB invalidation component 110A and 110B, respectively. As described in more detail below, the guest OS 108A and 108B can use the TLB invalidation component, within their respective logical partitions, to directly invalidate TLB entries in TLB 114, e.g., without calling the hypervisor 102. In one embodiment, the guest OS 108A and 108B may use the TLB invalidation components 110A and 110B to invalidate TLB entries during a context switch in which one process (operating with one address space) switches to another process (operating with a different address).

In one embodiment, the hypervisor 102 monitors the operation of the guest OS 108A and guest OS 108B to ensure that the guest OS 108A does not present a risk or threat to guest OS 108B (and vice versa) in the computing system 100. For example, as described in more detail below, the hypervisor 102 may set a maximum number of TLB invalidation attempts that each guest OS 108A and guest OS 108B is allowed to use. In one embodiment, if the hypervisor 102 determines that one of the guest OS 108 is exceeding the allotted number of TLB invalidation attempts, the hypervisor 102 can determine that the guest OS is a "rogue" OS that poses a threat to other guest OSs in the computing system 100 and can take steps to isolate the "rogue" OS from other parts of the computing system 100.

For example, as shown, the hypervisor 102 can use the quarantine component 104 to isolate a rogue guest OS. In one embodiment, the hypervisor 102 can use the quarantine component 104 to take away and/or reduce the remaining block of processing time allocated to the rogue guest OS. In one embodiment, the hypervisor 102 can use the quarantine component 104 to restrict the number of TLB invalidation attempts the rogue guest OS is allowed to use. In one embodiment, the hypervisor 102 can use the quarantine component 104 to restrict and/or prevent the rogue OS access to software and/or hardware resources of the computing system 100. For example, the hypervisor 102 can track the violations of a guest OS and, once the violations reach a threshold, the hypervisor 102 can quarantine the guest OS from one or more parts of the computing system 100. In one embodiment, the hypervisor 102 can notify a system administrator to the existence of a "rogue" guest OS to allow the system administrator to resolve the security threat. In general, however, the quarantine component 104 can perform any combination of the above techniques to detect and/or prevent guest OS from posing as a threat to other guest OS in the computing system 100.

Note FIG. 1 illustrates merely one example of a computing system that is configured to allow a guest OS to invalidate TLB entries (without calling the hypervisor) and is configured to prevent guest OS from posing as a security threat to other parts of the computing system 100. More generally, one of ordinary skill in the art will recognize that other embodiments of computing systems can also be configured to perform the techniques presented herein.

Figure 2:
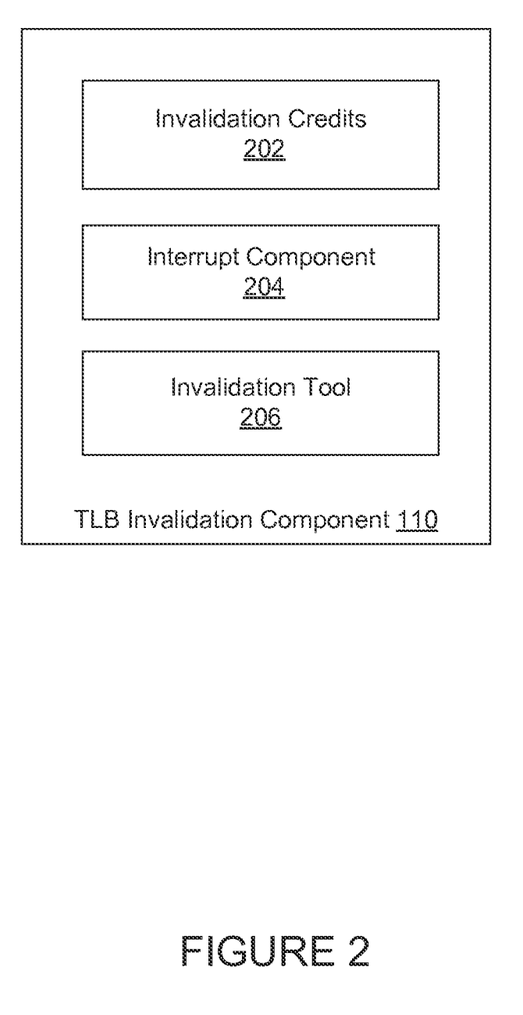
FIG. 2 illustrates an example of a TLB invalidation component, according to one embodiment.

FIG. 2 further illustrates an example of the TLB invalidation component 110, described relative to FIG. 1, according to one embodiment. As shown, the TLB invalidation component 110 includes invalidation credits 202, interrupt component 204, and invalidation tool 206.

In one embodiment, the TLB invalidation component 110 uses the invalidation tool 206 to invalidate TLB entries in the TLB 114. For example, the TLB invalidation component 110 uses the invalidation tool 206 to send tlbie instructions to the processor 112 in order to invalidate TLB entries in the TLB 114. Typically, however, the guest OS does not know on which processor it is running Therefore, in these cases, the invalidation tool 206 uses the broadcast form of the tlbie instruction, which is broadcasted on the system bus (not shown) within the computing system 100. In some cases, even if guest OS are allowed to broadcast tlbie instructions for their own VM (or logical partition), the broadcast form of the tlbie instructions may create a hazard for other guest OSs in the same computing system 100. For example, a rogue guest OS could flood the fabric with its tlbies causing performance degradation and/or denial of service for other guest OSs. Further, the broadcast of a large number of tlbie instructions on the system bus may cause the entire computing system to crash.

Embodiments presented herein provide techniques to control the number of tlbie instructions that a guest OS can issue per time block. For example, as shown, each guest OS is allocated a number of invalidation credits 202 by the hypervisor 102. In one embodiment, the hypervisor loads the invalidation credits 202 into a special purpose register (SPR) that the invalidation tool 206 is allowed to use when issuing tlbie instructions. The number of invalidation credits 202 that are allocated to each guest OS can be based on a variety of different criteria (or information). For example, in one embodiment, the number of invalidation credits allocated to the guest OS is a fixed number (e.g., determined by the total number of invalidation credits available to the hypervisor 102). Put differently, if the hypervisor 102 has M invalidation credits available and there are N guest OS 108 operating across N VMs 106, each guest OS may receive M/N invalidation credits, where M>N and N>1. In some cases, the M invalidation credits may be determined based on the threshold of broadcast invalidation credits the computing system 100 can tolerate (e.g., on the system bus) before experiencing performance degradation and/or system failure.

In another embodiment, the number of invalidation credits 202 allocated to the guest OS may be based on the particular processes or applications executed by the guest OS. For example, the hypervisor 102 can determine to allocate more invalidation credits to a guest OS if that guest OS is responsible for executing more complex processes, compared to, for example, another guest OS that is responsible for executing simple processes. In one embodiment, the number of invalidation credits 202 allocated to the guest OS may be based on system administrator input and/or feedback.

In one embodiment, each time the invalidation tool 206 issues a tlbie instruction, the processor 112, upon executing the instruction, decrements an invalidation credit 202 from the SPR. In one embodiment, once there are no remaining invalidation credits 202, the interrupt component 204 interrupts the guest OS 108. In one embodiment, the interrupt component 204 is implemented by the performance monitoring unit (PMU) of the processor 112. Such interrupt forces the guest OS 108 to call the hypervisor 102 to request more invalidation credits 202 to allow the guest OS 108 to continue running and use its current time block. Once the hypervisor 102 receives the interrupt, the hypervisor 102 may perform any of the techniques described above, such as reduce and/or take away the guest OS's remaining time block, inform the guest OS that the allocated number of invalidation credits 202 was exceeded, allocate more invalidation credits 202 to the guest OS 108, quarantine the guest OS (e.g., if the guest OS is a repeated violator), refuse to allocate additional invalidation credits 202, alert a system administrator to the violation, etc.

Figure 3:
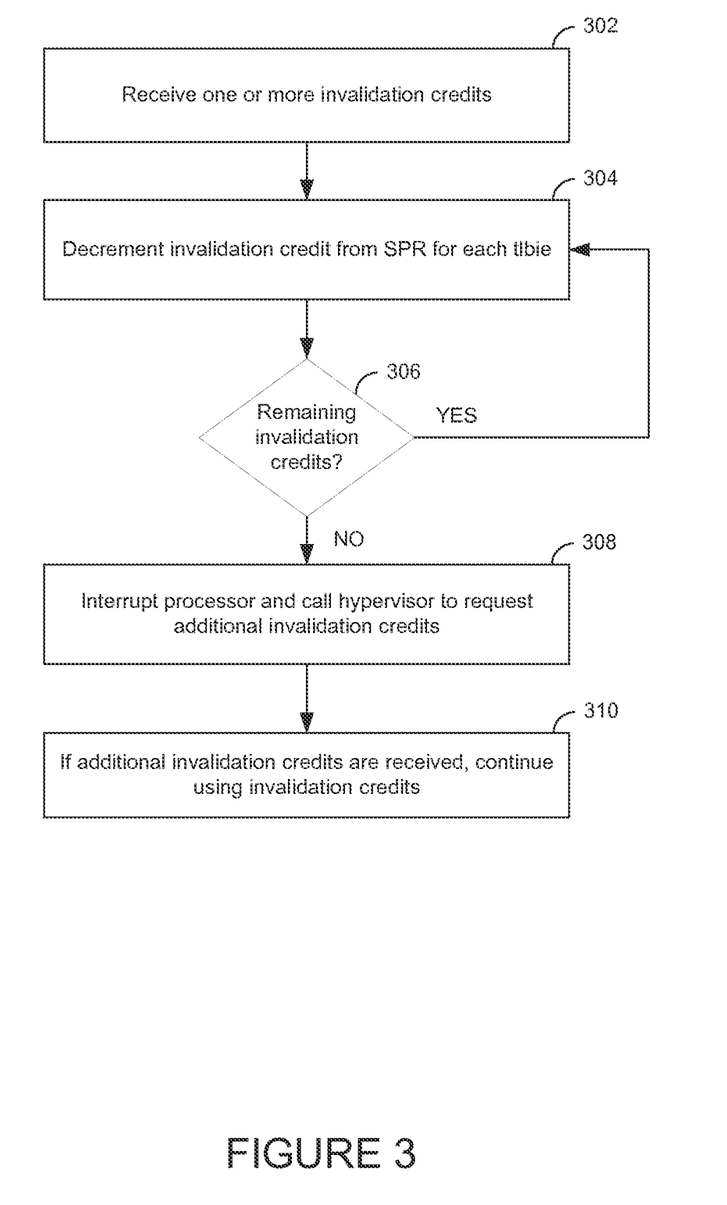
FIG. 3 illustrates a method for invalidating TLB entries by a guest OS, according to one embodiment.

FIG. 3 illustrates a method 300 for invaliding one or more TLB entries, according to one embodiment. As shown, the method 300 begins at step 302, where the guest OS 108 receives one or more invalidation credits, e.g., from a hypervisor 102. As mentioned above, in one embodiment, the invalidation credits can be loaded into a special purpose register for the guest OS 108. At step 304, the guest OS 108 decrements the number of invalidation credits by one each time the guest OS 108 issues a tlbie instruction. At step 306, the guest OS determines whether there are any remaining invalidation credits in the special purpose register. If so, the guest OS 108 continues to issue tlbie instructions as part of its normal operation. Put differently, the guest OS 108 can continue to issue tlbie instructions as part of every context switch, or other type of operation. On the other hand, if the guest 108 determines that are no remaining invalidation credits in the special purpose register, the guest OS 108 interrupts the processor and calls the hypervisor to request additional invalidation credits (step 308). At step 310, if additional invalidation credits are received, the guest OS 108 continues using invalidation credits as part of its normal operation.

Figure 4:
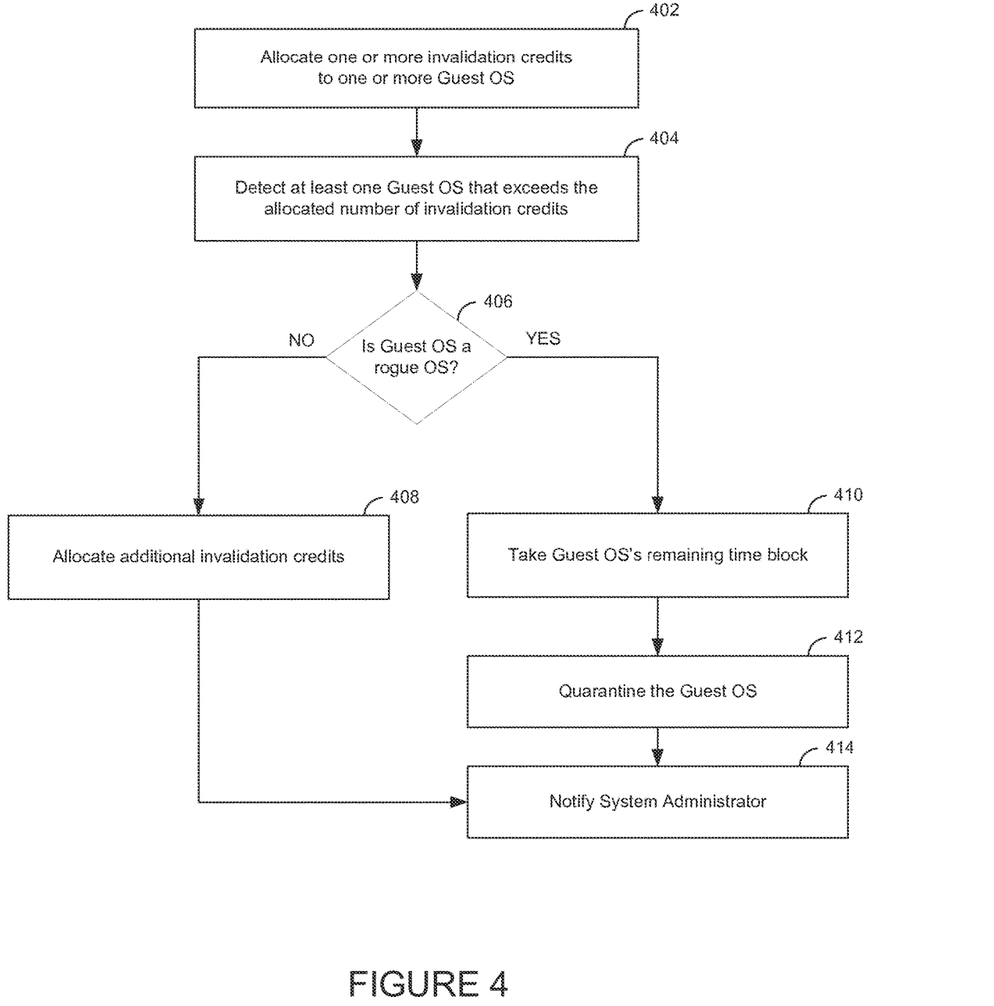
FIG. 4 illustrates a method for detecting and/or preventing a guest OS from harming a computing system, according to one embodiment.

FIG. 4 illustrates a method 400 for detecting and preventing a rogue guest OS that is allowed to issue tlbie instructions from threatening a computing system, according to one embodiment. As shown, the method 400 begins at step 402, where the hypervisor 102 allocates one or more invalidation credits to one or more guest OS 108 in a computing system. At 404, the hypervisor 102 detects that at least one guest OS has exceeded the allocated number of invalidation credits. For example, as mentioned above, once a guest OS exceeds its allocated number of invalidation credits, an interrupt is generated (e.g., by a PMU), which halts the guest OS and forces the guest OS to call the hypervisor 102 to request additional invalidation credits.

At 406, the hypervisor 102 determines whether the guest OS is a rogue OS (e.g., presents a threat or risk to other guest OS in the computing system 100). For example, as mentioned above, the hypervisor 102 may determine the guest OS is a rogue OS based on the number of violations, what percentage of the guest OS's allocated time block is being used by the guest OS, the type of processes the guest OS is executing, etc. If the hypervisor 102 determines the guest OS is not a rogue OS, then, at step 408, the hypervisor 102 allocates additional invalidation credits to the guest OS. The hypervisor 102 may also increment a counter that tracks the number of violations for the guest OS. If the hypervisor 102 determines the guest OS is a rogue OS, then, at step 410, the hypervisor 102 takes away (or reduces) the guest OS's remaining time block. At step 412, the hypervisor 102 quarantines the guest OS. At step 414, the hypervisor 102 notifies a system administrator.

Figure 5:
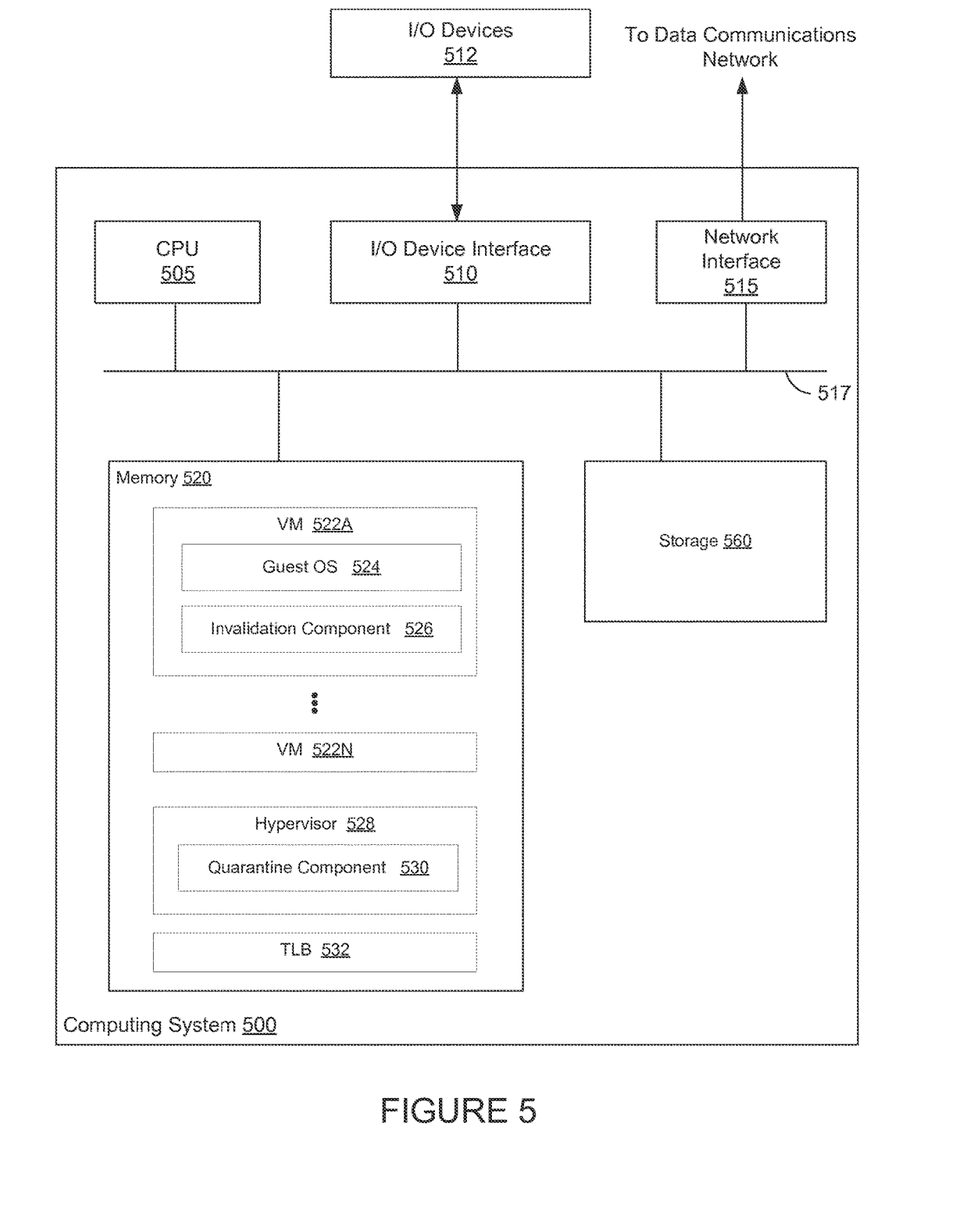
FIG. 5 illustrates a block diagram of a computing system configured to invalidate TLB entries and quarantine rogue OS, according to one embodiment.

FIG. 5 illustrates a computing system 500 configured to perform parallel zeroing of memory, according to one embodiment. As shown, the computing system 500 includes, without limitation, a central processing unit (CPU) 505, a network interface 515, a memory 520, and storage 560, each connected to a bus 517. The computing system 500 may also include an I/O device interface 510 connecting I/O devices 512 (e.g., keyboard, mouse, and display devices) to the computing system 500. Further, in context of this disclosure, the computing elements shown in the computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 520. The interconnect 517 is used to transmit programming instructions and application data between CPU 505, I/O devices interface 510, storage 560, network interface 515, and memory 520. Note CPU 505 is included to be representative of a single CPU, multiple CPUs, a single CPU having multiple processing cores, and the like. Memory 520 is generally included to be representative of a random access memory. The storage 560 may be a disk drive storage device. Although shown as a single unit, storage 560 may be a combination of fixed and/or removable storage devices, such as fixed disc drives, removable memory cards, or optical storage, network attached storage (NAS), or a storage area-network (SAN).

Illustratively, the memory 520 includes VMs 522A-522N, a hypervisor 528 and TLB 532. Each VM 522 includes a guest OS 524 and an invalidation component 526. As mentioned above, the guest OS 524 uses the invalidation component 526 to invalidate TLB entries in TLB 532. The hypervisor 528 includes quarantine component 530. The hypervisor 528 uses the quarantine component 530 to detect and/or prevent guest OS 524, which can invalidate TLB entries via invalidation component 526, from posing as a threat to other guest OS within computing system 500. In some embodiments, the invalidation component 526 and the quarantine component 530 generally represent logic (e.g., a software application, device firmware, an ASIC, etc.) that is configured to implement or more of the techniques presented herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the invention may be devised without departing from the basic scope thereof, and the scope thereof is determined by the claims that follow.

What is claimed is:

1. A method, comprising:
   receiving, by a first guest operating system (OS) of a plurality of guest OS, from a hypervisor, one or more invalidation credits for invalidating translation entries in a translation lookaside buffer (TLB), wherein the TLB is a cache that stores translations from virtual addresses used by the plurality of guest OS to physical addresses in main memory;
   using, by the guest OS, one invalidation credit of the one or more invalidation credits to directly invalidate a translation entry in the TLB without requiring interaction by the hypervisor, wherein the TLB is directly accessible by each of the plurality of guest OS through the use of invalidation credits;
   decrementing, by the guest OS, the one invalidation credit from the one or more invalidation credits after invalidating the translation entry in the TLB; and
   upon determining that there are no remaining invalidation credits, requesting, by the guest OS, additional invalidation credits from the hypervisor.

2. The method of claim 1, wherein the one or more invalidation credits are loaded into a special purpose register (SPR) and wherein the one invalidation credit is decremented from the SPR.

3. The method of claim 1, wherein the first guest OS invalidates the translation entry in the TLB upon switching from executing a first process to executing a second process.

4. The method of claim 1, wherein the hypervisor allows the first quest OS to use a processor for one or more scheduled time periods, and wherein, after requesting the additional invalidation credits from the hypervisor, the method further comprising:
   receiving, by the first guest OS, an indication from the hypervisor that the first guest OS is no longer allowed to use a remaining portion of a current time period.

5. The method of claim 1, wherein the hypervisor allows the first quest OS to use a processor for one or more scheduled time periods, and wherein, after requesting the additional invalidation credits from the hypervisor, the method further comprising:
   receiving, by the first guest OS, an indication from the hypervisor that the first guest OS is no longer allowed to issue instructions to the processor for any of the one or more scheduled time periods.

6. The method of claim 5, wherein the first guest OS receives the indication after the hypervisor determines the first guest OS poses a threat to a second guest OS in the plurality of guest OS, wherein the second guest OS corresponds to a second VM.

7. The method of claim 6, wherein the determination that the first guest OS poses a threat to the second guest OS is based on determining that a number of times the first guest OS has used the one or more invalidation credits exceeds a threshold.

8. A system, comprising:
   a processor;
   a hypervisor; and
   a memory storing program code, which, when executed on the processor, performs an operation comprising:
      receiving, by the first guest OS, from the hypervisor, one or more invalidation credits for invalidating translation entries in a translation lookaside buffer (TLB), wherein the TLB is a cache that stores translations from virtual addresses used by the plurality of guest OS to physical addresses in main memory;
      using, by the first guest OS, one invalidation credit of the one or more invalidation credits to directly invalidate a translation entry in the TLB without requiring interaction by the hypervisor, wherein the TLB is directly accessible by each of the plurality of guest OS through the use of invalidation credits;
      decrementing, by the first guest OS, the one invalidation credit from the one or more invalidation credits after invalidating the translation entry in the TLB; and
      upon determining that there are no remaining invalidation credits, requesting, by the first guest OS, additional invalidation credits from the hypervisor.

9. The system of claim 8, wherein the one or more invalidation credits are loaded into a special purpose register (SPR) and wherein the one invalidation credit is decremented from the SPR.

10. The system of claim 8, wherein the first guest OS invalidates the translation entry in the TLB upon switching from executing a first process to executing a second process.

11. The system of claim 8, wherein the hypervisor allows the first quest OS to use a processor for one or more scheduled time periods, and wherein, after requesting the additional invalidation credits from the hypervisor, the operation further comprises:
   receiving, by the first guest OS, an indication from the hypervisor that the first guest OS is no longer allowed to use a remaining portion of a current time period.

12. The system of claim 8, wherein the hypervisor allows the first quest OS to use a processor for one or more scheduled time periods, and wherein, after requesting the additional invalidation credits from the hypervisor, the operation further comprises:
   receiving, by the first guest OS, an indication from the hypervisor that the first guest OS is no longer allowed to issue instructions to the processor for any of the one or more scheduled time periods.

13. The system of claim 12, wherein the first guest OS receives the indication after the hypervisor determines the first guest OS poses a threat to a second guest OS in the plurality of guest OS, wherein the second guest OS corresponds to a second VM, and wherein the threat comprises a denial-of-service (DOS) attack.

14. The system of claim 13, wherein the determination that the first guest OS poses a threat to the second guest OS is based on a number of times the first guest OS has used the one or more invalidation credits.

15. A computer program product, comprising:
a non-transitory computer-readable storage medium having computer-readable program code embodied therewith, the computer-readable program code executable by one or more computer processors to perform an operation comprising:
receiving, by a first guest operating system (OS) of a plurality of guest OS, from a hypervisor, one or more invalidation credits for invalidating translation entries in a translation lookaside buffer (TLB), wherein the TLB is a cache that stores translations from virtual addresses used by the plurality of quest OS to physical addresses in main memory;
using, by the first guest OS, one invalidation credit of the one or more invalidation credits to directly invalidate a translation entry in the TLB without requiring interaction by the hypervisor, wherein the TLB is accessible by the plurality of guest OS through the use of invalidation credits;
decrementing, by the first guest OS, the one invalidation credit from the one or more invalidation credits after invalidating the translation entry in the TLB; and
upon determining that there are no remaining invalidation credits, requesting, by the first guest OS, additional invalidation credits from the hypervisor.

16. The computer program product of claim 15, wherein the one or more invalidation credits are loaded into a special purpose register (SPR) and wherein the one invalidation credit is decremented from the SPR.

17. The computer program product of claim 15, wherein the hypervisor allows the first quest OS to use a processor for one or more scheduled time periods, and wherein, after requesting the additional invalidation credits from the hypervisor, the operation further comprises receiving, by the first guest OS, an indication from the hypervisor of at least one of:
that the first guest OS is no longer allowed to use a remaining portion of a current time period; or
that the first guest OS is no longer allowed to issue instructions to the processor for any of the one or more time periods.

18. The computer program product of claim 17, wherein the first guest OS receives the indication after the hypervisor determines the first guest OS poses a threat to a second guest OS in the plurality of guest OS, wherein the second guest OS corresponds to a second VM, and wherein the determination that the first guest OS poses a threat to the second guest OS is based on a number of times the first guest OS has used the one or more invalidation credits.

19. The method of claim 6, wherein the determination that the first guest OS poses a threat to the second guest OS is based on a percentage of the one or more scheduled time periods corresponding to the first guest OS that are used by the first guest OS.

20. The method of claim 7, wherein the threshold is determined by the hypervisor based on a complexity of the processes or applications executed by the first guest OS.

* * * * *